United States Patent
Cann et al.

(10) Patent No.: US 11,180,582 B2
(45) Date of Patent: Nov. 23, 2021

(54) METHOD FOR IMPROVING ZIEGLER-NATTA CATALYST ACTIVITY

(71) Applicant: Univation Technologies, LLC, Houston, TX (US)

(72) Inventors: Kevin J. Cann, Tierra Verde, FL (US); Michael D. Awe, Middlesex, NJ (US); Wesley R. Mariott, Freeport, TX (US)

(73) Assignee: Univation Technologies, LLC, Houston, TX (US)

( * ) Notice: Subject to any disclaimer, the term of this patent is extended or adjusted under 35 U.S.C. 154(b) by 635 days.

(21) Appl. No.: 16/080,581

(22) PCT Filed: Feb. 28, 2017

(86) PCT No.: PCT/US2017/019910
§ 371 (c)(1),
(2) Date: Aug. 28, 2018

(87) PCT Pub. No.: WO2017/151592
PCT Pub. Date: Sep. 8, 2017

(65) Prior Publication Data
US 2021/0189024 A1    Jun. 24, 2021

Related U.S. Application Data

(60) Provisional application No. 62/301,894, filed on Mar. 1, 2016.

(51) Int. Cl.
| | |
|---|---|
| *C08F 4/654* | (2006.01) |
| *C08F 4/655* | (2006.01) |
| *C08F 210/16* | (2006.01) |
| *C08F 4/642* | (2006.01) |
| *C08F 4/659* | (2006.01) |
| *C08F 10/02* | (2006.01) |

(52) U.S. Cl.
CPC .......... *C08F 4/6421* (2013.01); *C08F 4/655* (2013.01); *C08F 4/6543* (2013.01); *C08F 4/6555* (2013.01); *C08F 4/65916* (2013.01); *C08F 10/02* (2013.01)

(58) Field of Classification Search
CPC ......... C08F 4/655; C08F 4/654; C08F 210/16
See application file for complete search history.

(56) References Cited

U.S. PATENT DOCUMENTS

| | | |
|---|---|---|
| 4,970,184 A | 11/1990 | Schauss et al. |
| 5,047,468 A | 9/1991 | Lee et al. |
| 5,082,818 A | 1/1992 | Matsuura et al. |
| 6,306,985 B1 | 10/2001 | Xiao et al. |
| 6,511,935 B2 | 1/2003 | Job et al. |
| 7,078,362 B2 | 7/2006 | Nagy |
| 7,432,220 B2 | 10/2008 | Garoff et al. |
| 7,790,818 B2 | 9/2010 | Vincenzi et al. |
| 8,012,903 B2 | 9/2011 | Apecetche et al. |
| 9,605,096 B2 | 3/2017 | Edwards et al. |
| 10,486,144 B2 | 11/2019 | Masi et al. |

FOREIGN PATENT DOCUMENTS

| | | |
|---|---|---|
| CN | 1223268 | 7/1999 |
| CN | 101220113 | 7/2008 |
| CN | 102399325 | 4/2012 |
| WO | 01/00692 | 1/2001 |
| WO | 2016/016355 | 2/2016 |

OTHER PUBLICATIONS

International Search Report & Written Opinion for related PCT Application PCT/US2017/019910, dated May 18, 2017 (11pgs).
International Preliminary Report for Patentability for related PCT Application PCT/US2017/019910, dated Sep. 13, 2018 (7 pgs).

*Primary Examiner* — Caixia Lu
*Assistant Examiner* — Caixia C Lu
(74) *Attorney, Agent, or Firm* — Brooks, Cameron & Huebsch, PLLC

(57) ABSTRACT

The present disclosure provides a method for improving the activity of Ziegler-Natta (ZN) catalysts. The method includes forming a modified precursor composition of a ZN catalyst by providing a precursor composition of the ZN catalyst for treatment with an aluminum alkyl compound in a liquid organic solvent. The precursor composition of the ZN catalyst includes at least one titanium compound. The at least one titanium compound in the precursor composition is treated with the aluminum alkyl compound in the liquid organic solvent, where the aluminum alkyl compound converts the at least one titanium compound in the precursor composition into a modified state of the ZN catalyst. At least a portion of the aluminum alkyl compound not consumed in converting the at least one titanium compound in the precursor composition into the modified state of the ZN catalyst and reaction by-product compounds in the liquid organic solvent are removed to form the modified precursor composition of the ZN catalyst.

16 Claims, No Drawings

METHOD FOR IMPROVING ZIEGLER-NATTA CATALYST ACTIVITY

This application is a National Stage Application under 35 U.S.C. § 371 of International Application Number PCT/US2017/019910, filed Feb. 28, 2017 and published as WO 2017/151592 on Sep. 8, 2017, which claims the benefit to U.S. Provisional Application 62/301,894, filed Mar. 1, 2016, the entire contents of which are incorporated herein by reference in its entirety.

TECHNICAL FIELD OF THE DISCLOSURE

The present disclosure relates generally to Ziegler-Natta catalysts and more particularly to a method for improving the activity of Ziegler-Natta catalysts.

BACKGROUND OF THE DISCLOSURE

A Ziegler-Natta (ZN) catalyst is composed of at least two parts: a transition metal compound and a main group metal alkyl compound. The transition metal compound is usually titanium or vanadium. The main group metal alkyl compound is usually an aluminum alkyl. In common practice, the titanium component is called "the catalyst" and the aluminum alkyl is called "the co-catalyst."

For its part, the aluminum alkyl is believed to play a variety of roles in the ZN catalyst. For example, the aluminum alkyl is thought to act as an alkylation agent and a reducing agent in the formation of active centers in the ZN catalyst. The aluminum alkyl also plays roles in the activity of the ZN catalyst. Improving the activity of the ZN catalyst can result in cost savings. For example, improvements in catalyst activity can result in improvements in catalyst productivity. The productivity of a catalyst, that is, the amount of polymer produced per gram of the catalyst, usually is a key economic factor that can make or break a new commercial development in the polyolefin industry. If the activity of the catalyst can be improved economic benefits will follow.

Increasing polymer bulk density is another important feature that allows for longer catalyst residence times, increased reactor throughput and better reactor operability. Improved polymer bulk density made with some ZN catalysts can be achieved by partial modification of the catalyst with aluminum alkyls prior to feeding the catalyst to the polymerization reactor. In some cases catalyst activity may decay during this step.

Considering the discussion above, a need exists for improving or maintaining the activity of ZN catalysts while improving polymer bulk density.

SUMMARY OF THE DISCLOSURE

The present disclosure provides a method for improving the activity of a Ziegler-Natta (ZN) catalyst. Specifically, it has been discovered that removing excess aluminum alkyls during the partial modification of the ZN catalyst helps to mitigate losses in activity, such as losses during the storage of the modified ZN catalyst. To this end, the present disclosure provides a method of forming a modified precursor composition of a ZN catalyst that includes providing a precursor composition of the ZN catalyst for treatment with an aluminum alkyl compound in a liquid organic solvent. The precursor composition of the ZN catalyst includes at least one titanium compound that is treated with the aluminum alkyl compound in the liquid organic solvent. The aluminum alkyl compound converts the at least one titanium compound in the precursor composition into the modified precursor composition of the ZN catalyst. At least a portion of the aluminum alkyl compound not consumed in converting the at least one titanium compound in the precursor composition into the modified state from the precursor composition and reaction by-product compounds in the liquid organic solvent are then removed to form the modified precursor composition of the ZN catalyst of the present disclosure.

Providing the precursor composition includes precipitating (or impregnating) at least one titanium compound on a carrier material. The at least one titanium compound has the formula $Ti(OR)_aX_b$, wherein R is selected from the group consisting of: a C1 to C14 aliphatic hydrocarbon moiety, a C1 to C14 aromatic hydrocarbon moiety, and COR' where R' is a C1 to C14 aliphatic or aromatic hydrocarbon moiety; X is selected from the group consisting of Cl, Br, I and combinations thereof; a is selected from the group consisting of 0, 1 and 2; b is an integer of 1 to 4 inclusive; and a+b=3 or 4. The at least one titanium compound is selected from the group consisting of: $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The disclosure further includes precipitating (or impregnating) at least one magnesium compound with the at least one titanium compound on the carrier material. The at least one magnesium compound has the formula $MgX_2$, wherein X is selected from the group consisting of Cl, Br, I and combinations thereof. The at least one magnesium compound is selected from the group consisting of: $MgCl_2$, $MgBr_2$ and $MgI_2$. Precipitating the at least one magnesium compound with the at least one titanium compound on the carrier material: dissolving the at least one magnesium compound and the at least one titanium compound in a mole ratio of 3:1 to 5:1 (mole the at least one magnesium compound:mole at least one titanium compound) in tetrahydrofuran to form a Magnesium compound/Titanium compound solution; mixing the carrier material in the Magnesium compound/Titanium compound solution; and removing the tetrahydrofuran to form the precursor composition of the ZN catalyst. The precursor composition can contain between 8 and 35 weight percent (wt. %) of tetrahydrofuran (THF), where wt. % is based on the total weight of the precursor composition.

For the present disclosure, the aluminum alkyl is selected from the group consisting of tri-n-hexyl aluminum, triethyl aluminum, diethyl aluminum chloride, trimethyl aluminum, dimethyl aluminum chloride, methyl aluminum dichloride triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{12}O)AlCl_2$ and combinations thereof. In a specific embodiment, the aluminum alkyl is selected from the group consisting of tri-n-hexyl aluminum, triethyl aluminum, diethyl aluminum chloride and combinations thereof. The aluminum alkyl can be added separately or as a mixture in treating the at least one titanium compound in the precursor composition.

Converting the at least one titanium compound in the precursor composition with the aluminum alkyl compound includes providing a molar ratio of the aluminum alkyl compound to the at least one titanium compound in a range of 1:1 to 10:1. Converting the at least one titanium compound in the precursor composition with the aluminum alkyl compound can also include providing a molar ratio of the aluminum alkyl compound to THF in a range of 0.2:1 to 1:1. The liquid organic solvent is selected from the group consisting of isopentane, hexane, heptane, toluene, xylene, naptha and combinations thereof. In an additional embodiment, the liquid organic solvent is an aliphatic mineral oil.

The removing step separates the liquid organic solvent containing the at least a portion of the aluminum alkyl compound not consumed in converting the at least one titanium compound in the precursor composition to the modified precursor composition of the ZN catalyst and reaction by-product compounds. After removing, the portion of the aluminum alkyl compound not consumed in converting the at least one titanium compound in the precursor composition into the modified state can be recycled for use in treating at least one titanium compound in an additional precursor composition.

The modified precursor composition of the ZN catalyst can then be dried to remove any remaining liquid organic solvent in the modified precursor composition of the ZN catalyst. The modified precursor composition of the ZN catalyst can then be used or stored for use, where such storage can be, if desired, in aliphatic mineral oil or in an inert environment.

DETAILED DESCRIPTION

The present disclosure provides a method for improving the activity of a Ziegler-Natta (ZN) catalyst. Specifically, it has been discovered that removing excess aluminum alkyls during the partial modification of the ZN catalyst helps to mitigate losses in activity, such as losses during the storage of the modified precursor composition of the ZN catalyst. As discussed herein, aluminum alkyls are used in excess in forming the modified precursor composition of ZN catalysts. During the preparation of the modified precursor composition, aluminum alkyls, neat or as a solution in a liquid organic solvent, are added to the ZN catalyst precursors to form a slurry. The liquid organic solvent is removed by drying the slurry to produce the modified precursor composition of the ZN catalyst.

Up until this point, however, the excess aluminum alkyl present in the slurry was not removed, but was instead allowed to deposit in the pores and/or on the surface of the modified ZN catalyst. What has been discovered is that allowing this excess aluminum alkyl to deposit on the modified ZN catalyst can result in a degree of "aging" in the modified ZN catalyst where over time the modified ZN catalyst will gradually loose activity, even if just being stored. The present disclosure has discovered that this activity loss over time can be mitigated by removing the excess aluminum alkyls prior to the final dry down of the modified precursor composition of the ZN catalyst.

As used herein, the singular forms "a," "an," and "the" include plural referents unless otherwise specified. For example, as discussed herein the aluminum alkyl compound is used in the method of forming the modified precursor composition of the ZN catalyst includes the use of two or more of the aluminum alkyl compounds.

References herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

The modified precursor composition of the ZN catalyst of the present disclosure is a supported catalyst that includes at least titanium as the transition metal compound and an aluminum alkyl as the co-catalyst. The modified precursor composition of the ZN catalyst is formed by first providing a carrier material. As discussed herein, the carrier material can be either a porous silica support or a non-porous silica support. The porous silica support and the non-porous silica support used in the present disclosure are both structurally and chemically different from each other such that each is processed in a different way to form the precursor composition. For example, when the carrier material is a porous silica support it can be dried at a high temperature to both remove water and at least a portion of reactive groups on the surface of the carrier material. Such reactive groups include, but are not limited to, hydroxyl and silanol groups. By way of example, such a drying step for the porous silica support can take place at 600° C. for a time of 1 to 4 hours.

The porous silica support having been dried is treated with an organoaluminum compound, which reacts with at least some of the remaining reactive groups on the surface of the porous silica support. For example, the dried porous silica support can be treated with triethylaluminum (TEAL), which reacts with at least some of the remaining reactive groups. This reaction takes place by slurrying the dried porous silica support in a liquid organic solvent (e.g., isopentane or hexane) with the TEAL. The liquid organic solvent is then separated from the porous silica support, and the porous silica support is dried to yield the carrier material in the form of a dried powder that can be referred to as TEAL on silica, or "TOS."

In an alternative embodiment, a non-porous silica support can be used as the carrier material. Examples of the non-porous silica support include fumed silica formed from submicron-sized spheres fused into branched chains. Hydroxyl groups present on the non-porous silica support can be chemically capped. An example such a non-porous silica support includes CAB-O-SIL® TS-610, manufactured by the Cabot Corporation.

A transition metal compound is then added to the carrier material by bring the transition metal compound into solution in an electron donor compound, adding the carrier material and then evaporating the electron donor compound to precipitate the transition metal compound onto the carrier material. For example, transition metal compounds such as $TiCl_3$ and $MgCl_2$ can be dissolved in tetrahydrofuran (THF). This solution is added to the carrier material, after which the THF is evaporated to precipitate the transition metal compounds into the pores and/or the surface of the carrier material. Generally, the electron donor compound is removed by drying the carrier material at temperatures of at least 60° C., thereby causing the transition metal compound (e.g., the at least one titanium compound) to precipitate on the carrier material. The resulting structure is known as a "precursor" composition, which includes at least one titanium compound. In addition to the at least one titanium compound, the precursor composition of the ZN catalyst can further include a magnesium compound.

The precursor composition of the ZN catalyst is treated with an aluminum alkyl compound in the liquid organic solvent. The precursor composition of the ZN catalyst can be treated with one or more of the aluminum alkyl compound, as provided herein. It is possible to use two or more of the aluminum alkyl compounds sequentially or simultaneously in treating the precursor composition if desired. For example, the precursor catalyst can be slurried in isopentane or hexane to which diethylaluminum chloride (DEAC) and tri-n-hexylaluminum (TnHAl) are added. Treating the at least one titanium compound in the precursor composition with the aluminum alkyl compound in the liquid organic solvent converts the at least one titanium compound in the precursor composition into a modified precursor composition of the ZN catalyst.

As discussed herein, an excess of the aluminum alkyl compound is used in treating the at least one titanium compound in the precursor composition. After treating the at least one titanium compound in the precursor composition the portion of the aluminum alkyl compound not consumed in converting the at least one titanium compound in the precursor composition into the modified state and reaction by-product compounds in the liquid organic solvent are removed from the precursor composition to form the modified precursor composition of the ZN catalyst. This removing step helps to mitigate catalytic activity losses by removing at least a portion of the aluminum alkyl compound not consumed in forming the modified precursor composition of the ZN catalyst and reaction by-product compounds.

After the removing step, the modified precursor composition of the ZN catalyst can be dried. As necessary, additional co-catalysts can be used with the modified precursor composition of the ZN catalyst to fully activate the ZN catalyst, where the co-catalyst can be added separately to the reactor.

The carrier material that may be employed in the ZN catalysts of the present disclosure generally has a particle size distribution within the range of from 2 μm (microns) to 100 μm (microns), and a median particle size in the range of from 20 μm (microns) to 50 μm (microns). In certain exemplary embodiments, the carrier material has a particle size distribution within the range of from 2 μm (microns) to 80 μm (microns). The carrier material has a median particle size in the range of from 30 μm (microns) to 50 μm (microns), and in the range of from 35 to 45 μm (microns) in certain exemplary embodiments. The carrier material can have a particle size distribution in which no more than 10% of the particles have a size below 10 μm (microns), and no more than 10% of the particles have a size greater than 50 μm (microns). In certain exemplary embodiments, the carrier material has a particle size distribution in which no more than 10% of the particles have a size below 12 μm (microns), and no more than 8% of the particles have a size greater than 50 μm (microns). It also may be desirable for such carrier material to have a surface area of 200 square meters per gram to 800 square meters per gram, and in certain exemplary embodiments, from 200 square meters per gram to 350 square meters per gram.

The carrier material generally should be dry, that is, free of absorbed water. Drying of the carrier material generally is performed by heating it at a temperature of at least 600° C.

For the embodiments discussed herein, the carrier material can be non-porous or porous silica support. For example, the average pore volume of the porous silica support can range from 1.4 ml/gram to 3.5 ml/gram. Non-porous silica support can also be used in forming the precursor composition of the ZN catalyst, where the non-porous silica is combined with the transition metal compound in the electron donor compound and then spray dried to form the precursor composition of the ZN catalyst, as discussed herein.

As mentioned herein, the transition metal compounds used to form the precursor composition of the ZN catalyst of the present disclosure can include at least one titanium compound. Generally, the titanium compound has the formula:

$$\text{Ti(OR)}_a\text{X}_b$$

wherein

R is a $C_1$ to $C_{14}$ aliphatic or aromatic hydrocarbon moiety, or COR' where R' is a $C_1$ to $C_{14}$ aliphatic or aromatic hydrocarbon moiety;

X is selected from the group consisting of Cl, Br, I and combinations thereof;

a is 0, 1 or 2;

b is an integer of 1 to 4 inclusive; and a+b=3 or 4.

The titanium compounds individually may be present in the catalysts of the present disclosure, or the titanium compounds may be present in combinations thereof. A list of suitable titanium compounds includes $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The transition metal compounds used to form the precursor composition of the ZN catalyst of the present disclosure can also include at least one magnesium compound. For the various embodiments, at least one magnesium compound can be precipitated with the at least one titanium compound on the carrier material. Generally, the magnesium compound has the formula:

$$\text{MgX}_2$$

wherein X is selected from the group consisting of Cl, Br, I and combinations thereof.

Such magnesium compounds may be present individually in the precursor composition of the ZN catalyst of the present disclosure, or the magnesium compounds may be present in combinations thereof. A list of suitable magnesium compounds includes $MgCl_2$, $MgBr_2$ and $MgI_2$. In certain exemplary embodiments of the present disclosure, the magnesium compound may be anhydrous $MgCl_2$.

The precursor composition may be formed by dissolving the titanium compound and the magnesium compound in the electron donor compound at a temperature in the range of from 20° C. up to the boiling point of the electron donor compound. The titanium compound can be added to the electron donor compound before, or after, the addition of the magnesium compound or concurrent therewith. The dissolution of the titanium compound and the magnesium compound may be facilitated by stirring, and in some instances by refluxing, these two compounds in the electron donor compound.

Generally, the magnesium compound and the titanium compound are dissolved in the electron donor compound at the desired molar ratio. For example, the magnesium compound and the titanium compound can be dissolved in the electron donor compound at a mole ratio of 3:1 to 5:1 (mole the at least one magnesium compound:mole at least one titanium compound) in tetrahydrofuran to form a Magnesium compound/Titanium compound solution. The carrier material is mixed with the Magnesium compound/Titanium compound solution, after which the electron donor compound (e.g., the tetrahydrofuran) is removed to form the precursor composition of the ZN catalyst.

For the precursor composition of the ZN catalyst, the magnesium compound may be present in an amount in the range of from 0.5 to 56 moles of magnesium compound per mole of titanium compound. In certain exemplary embodiments of the present disclosure, the magnesium compound may be present in the catalysts of the present disclosure in an amount in the range of from 1.5 to 11 moles of magnesium compound per mole of titanium compound. In certain exemplary embodiments of the present disclosure, the magnesium compound may be present in the catalysts of the present disclosure in an amount in the range of from 1.5 to 7 moles of magnesium compound per mole of titanium compound. Generally, the titanium compound and the magnesium compound may be used in a form that will facilitate their dissolution in the electron donor compound, as described herein.

After the titanium compound and the magnesium compound are dissolved, the precursor composition may be isolated by removing (e.g., drying) the electron donor compound to precipitate the precursor composition on the carrier material. The precursor composition may be isolated, generally in the form of fine, free-flowing particles having an average particle size in the range of from 2 to 100 μm (microns).

When prepared according to the procedure above, the precursor composition has the formula:

$$Mg_mTi_1(OR)_nX_p[ED]_q$$

wherein:
1. is the electron donor compound;
2. m is ≥0.5 to ≤56, and, in certain exemplary embodiments, ≥1.5 to ≤11;
3. n is 0, 1 or 2;
4. p is ≥2 to ≤116, and, in certain exemplary embodiments, ≥6 to ≤14;
5. q is ≥2 to ≤85, and, in certain exemplary embodiments, ≥3 to ≤10;
6. R is a $C_1$ to $C_{14}$ aliphatic or aromatic hydrocarbon moiety, or COR' wherein R' is a $C_1$ to $C_{14}$ aliphatic or aromatic hydrocarbon moiety;
7. X is selected from the group consisting of Cl, Br, I and combinations thereof; and
8. the subscript for the element titanium (Ti) is the arabic numeral one.

The precursor composition then may be impregnated, in a weight ratio of 0.003 to 2, and, in certain exemplary embodiments, 0.1 to 0.33, parts of the precursor composition into one part by weight of the carrier material. The precursor composition may also be impregnated, in a weight ratio of 1 to 2.

The electron donor compound generally may be any organic compound that is liquid at 25° C., and that may be capable of dissolving both the titanium compound and the magnesium compound. A list of suitable electron donor compounds includes such compounds as alkyl esters of aliphatic and aromatic carboxylic acids, aliphatic ethers, cyclic ethers and aliphatic ketones. In certain embodiments, suitable electron donor compounds may be alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and, in certain embodiments, $C_4$ cyclic mono- or di-ethers; $C_3$ to $C_6$, and, in certain embodiments, $C_3$ to $C_4$, aliphatic ketones. In certain exemplary embodiments, the electron donor compound may be methyl formate, ethyl acetate, butyl acetate, ethyl ether, hexyl ether, tetrahydrofuran, dioxane, acetone or methyl isobutyl ketone, among others.

The electron donor compounds may be present individually in the catalysts of the present disclosure, or they may be present in combinations thereof. Generally, the electron donor compound may be present in the range of from 2 to 85 moles of the electron donor compound per mole of the titanium compound. In certain embodiments, the electron donor compound may be present in the catalysts of the present disclosure in an amount in the range of from 3 to 10 moles of the electron donor compound per mole of the titanium compound. The precursor composition can contain between 8 and 35 weight percent (wt. %) of the electron donor compound, such as THF, where wt. % is based on the total weight of the precursor composition.

The electron donor compound is then removed by drying the carrier material at temperatures of at least 60° C., thereby causing the at least one titanium compound and the magnesium compound (when present) to precipitate on the carrier material so as to form the precursor composition of the ZN catalyst.

As previously discussed, non-porous silica can be used as the carrier material, where the non-porous silica is combined with the transition metal compound in the electron donor compound and then spray dried to form the precursor composition of the ZN catalyst. For example, non-porous fumed silica can be mixed with the Magnesium compound/Titanium compound solution, as discussed herein. The mixture can be stirred and allowed to react at a temperature of about, for example, 70° C. in a nitrogen atmosphere (<5 ppm $H_2O$). The electron donor compound (e.g., the tetrahydrofuran) is removed by a spray drying process to form the precursor composition of the ZN catalyst. An example of such a spray drying process includes a closed cycle spray dryer equipped with a rotary atomizer. An example of a non-porous fumed silica for such a process includes those having a particle size in the range of from 0.1 μm to 1 μm, such as CAB-O-SM® TS-610, manufactured by the Cabot Corporation.

As discussed above, the precursor composition of the ZN catalyst is treated with an aluminum alkyl compound in the liquid organic solvent. The precursor composition of the ZN catalyst can be treated with one or more of the aluminum alkyl compound, as provided herein, where it is possible to use two or more of the aluminum alkyl compounds sequentially or simultaneously in treating the precursor composition if desired.

The liquid organic solvent should be non-polar and capable of dissolving the aluminum alkyl, but not the precursor composition. Among the liquid hydrocarbon solvents which can be employed to dissolve the aluminum alkyl are liquid organic solvents selected from the group consisting of isopentane, hexane, heptane, toluene, xylene, naptha and combinations thereof. Other liquid organic solvents can include aliphatic mineral oils such as Kaydol™, and Hydrohrite™ 550, where such aliphatic mineral oils are useful with the precursor composition of the ZN catalyst formed with the non-porous silica support.

The aluminum alkyl compound acts as a partial modifier for the precursor composition, where the aluminum alkyl compound helps to form the modified precursor composition of the ZN catalyst of the present disclosure. The aluminum alkyl compound (the partial modifier compound) generally has the formula:

$$Al(R'')_cX'_dH_e$$

wherein
X' is Cl, or OR''';
R'' and R''' are the same or different, and are $C_1$ to $C_{14}$ saturated hydrocarbon moieties;
d is 0 to 1.5;
e is 1 or 0;
and c+d+e=3.

Such aluminum alkyl compound may be present individually in the modified precursor composition of the ZN catalyst of the present disclosure, or they may be present in combinations thereof. A list of suitable aluminum alkyl compound includes those selected from the group consisting of tri-n-hexyl aluminum, triethyl aluminum, diethyl aluminum chloride, trimethyl aluminum, dimethyl aluminum chloride, methyl aluminum dichloride triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{12}O)AlCl_2$ and combinations thereof. Preferably, the aluminum alkyl is selected from the group consisting of tri-n-hexyl aluminum, triethyl aluminum, diethyl aluminum chloride and combinations thereof. As discussed herein, the partial modifier compound can be added separately and/or as mixtures when two or more of the partial modifier compounds are used. It is also possible to modify the precursor composition using the corresponding bromine and iodine compounds to those provided above.

Generally, the aluminum alkyl compound may be present in the modified precursor composition of the ZN catalyst of the present disclosure having an aluminum alkyl compound to Ti molar ratio of greater than 0:1 to 10:1 (mole aluminum alkyl compound:mole Ti) and, in certain exemplary embodiments, from 4:1 to 8:1 (mole aluminum alkyl compound: mole Ti). Converting the at least one titanium compound in the precursor composition with the aluminum alkyl compound can also include providing a molar ratio of the aluminum alkyl compound to THE (i.e., moles of Al:moles of THF) in a range of 0.2:1 to 1:1. When two or more aluminum alkyls are used, each can have the same or its own individual mole ratio to the THF. For example, a first aluminum alkyl compound can have a mole ratio with the THF of 0.2:1, while a second aluminum alkyl compound can have a mole ration with the THF of 0.5:1.

After treating the at least one titanium compound in the precursor composition, the portion of the aluminum alkyl compound not consumed in converting the at least one titanium compound in the precursor composition into the modified state and reaction by-product compounds in the liquid organic solvent are removed from the precursor composition to form the modified precursor composition of the ZN catalyst. The removing step can be accomplished using known filtering and/or decanting techniques that allow for the separation of the modified precursor composition of the ZN catalyst from the liquid organic solvent containing the portion of the aluminum alkyl compound not consumed in converting the at least one titanium compound in the precursor composition and reaction by-product compounds. It is also possible to rinse the modified precursor composition of the ZN catalyst either during the removing step or after the removing step with liquid organic solvent that does not contain the aluminum alkyl compound or reaction by-product compounds formed during the conversion of the titanium compound in the precursor composition. In other words, it is possible to rinse the modified precursor composition of the ZN catalyst with fresh liquid organic solvent either during the removing step or after the removing step.

In an additional embodiment, the removing step can also include neutralizing the aluminum alkyl compounds not consumed in converting the at least one titanium compound in the precursor composition into the modified state and/or the reaction by-product compounds in the liquid organic solvent. For example, compounds having reactive groups such as hydroxyl groups could be used to react with and neutralize the aluminum alkyl compounds not consumed in converting the at least one titanium compound in the precursor composition into the modified state. An example of such a compound can include silica having hydroxyl groups available for reaction. The use of other reactive compounds is also possible, where such reactive groups do not react with or interfere with the titanium compound.

The present disclosure also further including recycling the portion of the aluminum alkyl compound not consumed in converting the at least one titanium compound in the precursor composition into the modified state for use in treating at least one titanium compound in an additional precursor composition. This allows for further cost savings and efficiencies to be realized in forming the modified precursor composition of the ZN catalyst.

The modified precursor composition of the ZN catalyst can then be dried after the removing step to remove the remaining liquid organic solvent from the modified precursor composition of the ZN catalyst. The drying step can take place at a temperature of 20° C. to 80° C., and, in certain exemplary embodiments, between 50° C. to 70° C.

The resulting modified precursor composition of the ZN catalyst is a free-flowing solid particulate material that can then be used or stored for use, where such storage can be, if desired, in aliphatic mineral oil or in an inert environment, such as under dry nitrogen gas or argon gas.

When used, the modified precursor composition of the ZN catalyst may be fed to the polymerization reactor where the activation may be completed with an additional activator compound, which may be the same or a different compound used in forming the modified precursor composition of the ZN catalyst. During the activation, the aluminum alkyl compound may be present in the modified precursor composition of the ZN catalyst of the present disclosure in an amount in the range of from 1 to 400 moles of aluminum alkyl compound per mole of the titanium compound. For example, activating the modified precursor composition of the ZN catalyst can include providing a molar ratio of the aluminum alkyl compound to the at least one titanium compound in a range of 1:1 to 60:1.

In certain exemplary embodiments, the additional activator compound and the modified precursor composition of the ZN catalyst may optionally be fed to the reactor through separate feed lines. In certain of such embodiments, the additional activator compound may be sprayed into the reactor in either undiluted form (e.g., "neat"), or in the form of a solution of the additional activator compound in a liquid organic solvent (e isopentane, hexane, or mineral oil). Such solution may contain 2 to 30 weight percent of the activator compound. In certain of such embodiments, the additional activator compound may be added to the reactor in such amounts as to provide, along with the amounts of activator compound and titanium compound fed with the activated precursor composition of the ZN catalyst, a total Al to Ti molar ratio (mole Al:mole Ti) in the reactor of 10:1 to 400:1, and, in certain exemplary embodiments, from to 60:1. The additional amounts of activator compound added to the reactor may react with, and complete the activation of, the modified precursor composition of the ZN catalyst in the reactor.

The ZN catalyst of the present disclosure can be used in a polymerization process. The polymerization process may be conducted by contacting a stream of monomer(s), in a gas phase process (such as in the fluid bed process), and substantially in the absence of catalyst poisons (e.g., moisture, oxygen, CO, $CO_2$, and acetylene) with a catalytically effective amount of the activated ZN catalyst at a temperature and at a pressure sufficient to initiate the polymerization reaction. Comonomers can also be used during the polymerization process. Examples of such comonomers include one or more $C_3$ to $C_8$ comonomers that may be copolymerized with the monomer (e.g., ethylene) in forming the polymer with the ZN catalyst of the present disclosure.

A variety of polymers may be produced as products using the activated ZN catalyst of the present disclosure. The polymers that may be prepared with the ZN catalysts of the present disclosure include, inter cilia, copolymers that include a major mol percent (e.g., ≥90%) of ethylene, and a minor mol percent (e.g., ≤10%) of one or more $C_3$ to $C_8$ alpha olefins. Generally, the $C_3$ to $C_8$ alpha olefins will not contain any branching on any of their carbon atoms that may be closer than the fourth carbon atom from the double bond. Examples of suitable $C_3$ to $C_8$ alpha olefins include propylene, butene-1, pentene-1, hexene-1,4-methyl pentene-1, heptene-1 and octene-1. In certain exemplary embodiments of the present disclosure, the $C_3$ to $C_8$ alpha olefins may include propylene, butene-1, hexene-1,4-methyl pentene-1 and octene-1.

EXAMPLES

In the following paragraphs, Arabic numerals designate examples (Ex) of the disclosure and capital letters designate comparative examples (CEx). Unless otherwise noted, all compounds and reagents used herein were acquired from SIGMA-ALDRICH and were use as supplied.

Precursor Composition Preparation

The precursor composition used in the Examples was prepared as described in European Patent Specification EP 1 891 125 (incorporated herein by reference in its entirety).

Comparative Examples (CEx)

Suspend 4.0 g of the Precursor Composition Preparation containing approximately 15 wt. % tetrahydrofuran (THF), based on total weight of the Precursor Composition Preparation, in 35 ml of hexane while stirring. Add 3.8 mmol of diethylaluminum chloride (DEAC) (as a 0.62 M solution in hexane) to the suspension. Allow the suspension to stir 30 minutes at ambient temperature (about 23° C.) and then add 1.6 mmol tri-n-hexylaluminum (TnHAl) (as a 1 M solution in hexane). Allow the suspension to stir for an additional 30 minutes before drying the catalyst under vacuum to remove the volatiles.

Conduct lab slurry polymerizations in a 1 L autoclave reactor using isobutane (500 mL) as the diluent. Thoroughly dry the reactor under a nitrogen purge at elevated temperature (100° C.) and cool to about 40° C. prior to loading the diluent and 1-hexene comonomer (10 mL). Charge hydrogen (1500 mL) and ethylene (150 psi) into the reactor. Use triethylaluminum (TEAL) as the co-catalyst at an approximately 50 to 1 molar ratio of the Al/Ti (Ti from catalyst).

Introduce the specified amount of catalyst into the reactor (Table 1, below) and line out the reactor internal temperature at 85° C. Feed ethylene on demand to maintain a given reactor pressure. Cool and vent the reactor at the conclusion of the experiment. Transfer the content of the reactor to a pan. Allow any residual volatiles to evaporate prior to determining the final polymer weight. Evaluate the catalyst of Comparative Example A (CEx A) in a lab slurry batch reactor immediately after being prepared as well as after having been allowed to age for 1 day, 2 days, and 9 days.

Inventive Examples (Ex)

Prepare the catalyst for the Inventive Examples like those prepared for the Comparative Example A, but with the following changes. Suspend 4.0 g of the Precursor Composition Preparation containing approximately 15 wt. % tetrahydrofuran (THF), based on total weight of the Precursor Composition Preparation, in 35 ml of hexane while stirring. Add 3.8 mmol of diethylaluminum chloride (DEAC) (as a 0.62 M solution in hexane) to the suspension. Allow the suspension to stir 30 minutes at ambient temperature (about 23° C.) and then add 1.6 mmol tri-n-hexylaluminum (TnHAl) (as a 1 M solution in hexane). Allow the suspension to stir for an additional 30 minutes. Stop the stirring and allow the solids to settle. Decant the supernate from the suspension and add hexane to the remaining solids. Mix briefly, allow the solids to settle and then decant the supernate. Repeat this wash process once more and then dry the resulting solids under vacuum to remove any remaining volatiles. The decant-wash steps serve to remove any by-products and/or unreacted aluminum alkyl compounds (TnHAl and DEAC) from the partial activation step. Alternatively, filtering and washing the solids to achieve a similar end result Slurry batch reactor runs: Evaluate the catalyst for the Inventive Example 1 in a lab slurry batch reactor immediately after being prepared as well as after having been allowed to age for 1 day and 6 days.

TABLE 1

Comparison of Catalyst Activity for CEx A and Ex 1 as a function of Aging Time

| Catalyst | Aging Time (days) | Catalyst Charge (g) | Reaction Time (min) | Polymer Yield (g) | Activity (g PE/g catalyst · hr) |
|---|---|---|---|---|---|
| CEx A | 0 | 0.027 | 30 | 95 | 6,912 |
| CEx A | 1 | 0.030 | 30 | 78 | 5,279 |
| CEx A | 2 | 0.027 | 30 | 68 | 5,039 |
| CEx A | 9 | 0.029 | 30 | 60 | 4,087 |
| Ex 1 | 0 | 0.030 | 30 | 138 | 9,113 |
| Ex 1 | 1 | 0.031 | 30 | 132 | 8,793 |
| Ex 1 | 6 | 0.028 | 30 | 135 | 9,496 |

As seen in Table 1, the catalyst of Ex 1 maintained its initial activity even after aging for 6 days, unlike CEx A, which lost approximately 40% of its initial activity over the course of 9 days.

What is claimed is:

1. A method of forming a modified precursor composition of a Ziegler-Natta (ZN) catalyst, comprising:
   providing a precursor composition of the ZN catalyst for treatment with an aluminum alkyl compound in a liquid organic solvent, where the precursor composition of the ZN catalyst includes at least one titanium compound, wherein providing the precursor composition includes precipitating at least one magnesium compound with the at least one titanium compound on a silica carrier material;
   treating the at least one titanium compound in the precursor composition with the aluminum alkyl compound in the liquid organic solvent, where the aluminum alkyl compound converts the at least one titanium compound in the precursor composition into a modified state of the ZN catalyst; and
   removing at least a portion of the aluminum alkyl compound and reaction by-product compounds in the liquid organic solvent not consumed in converting the at least one titanium compound in the precursor composition into the modified state from the precursor composition to form the modified precursor composition of the ZN catalyst;

where precipitating the at least one magnesium compound with the at least one titanium compound on the silica carrier material includes:
  i) dissolving in tetrahydrofuran the at least one magnesium compound and the at least one titanium compound to form a Magnesium compound/Titanium compound solution in a molar ratio of 3:1 to 5:1 moles of the at least one magnesium compound to moles of the at least one titanium compound;
  ii) mixing the silica carrier material in the Magnesium compound/Titanium compound solution;
  iii) removing the tetrahydrofuran to form the modified precursor composition of the ZN catalyst, and
  iv) drying the modified precursor composition of the ZN catalyst after removing the tetrahydrofuran,
  wherein the ZN catalyst has improved activity over time than the activity of a ZN catalyst formed without employing i), ii), iii), and iv).

2. The method of claim 1, wherein the aluminum alkyl is selected from the group consisting of tri-n-hexyl aluminum, triethyl aluminum, diethyl aluminum chloride, trimethyl aluminum, dimethyl aluminum chloride, methyl aluminum dichloride triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{12}O)AlCl_2$ and combinations thereof.

3. The method of claim 1, wherein the aluminum alkyl is selected from the group consisting of tri-n-hexyl aluminum, triethyl aluminum, diethyl aluminum chloride and combinations thereof.

4. The method of claim 1, wherein treating the at least one titanium compound in the precursor composition with the aluminum alkyl compound includes providing a molar ratio of the aluminum alkyl compound to the at least one titanium compound in a range of 1:1 to 10:1.

5. The method of claim 1, wherein treating the at least one titanium compound in the precursor composition with the aluminum alkyl compound includes providing a molar ratio of the aluminum alkyl compound to the at least one titanium compound in a range of 4:1 to 8:1.

6. The method of claim 1, wherein treating the at least one titanium compound in the precursor composition with the aluminum alkyl compound includes providing a molar ratio of the aluminum alkyl compound to tetrahydrofuran in a range of 0.2:1 to 1:1.

7. The method of claim 1, wherein the liquid organic solvent is selected from the group consisting of isopentane, hexane, heptane, toluene, xylene, naptha and combinations thereof.

8. The method of claim 1, wherein the liquid organic solvent is an aliphatic mineral oil.

9. The method of claim 1, further including recycling the portion of the aluminum alkyl compound not consumed in converting the at least one titanium compound in the precursor composition into the modified state for use in treating at least one titanium compound in an additional precursor composition.

10. The method of claim 1, wherein the at least one titanium compound has the formula $Ti(OR)aX_b$, wherein R is selected from the group consisting of: a C1 to C14 aliphatic hydrocarbon moiety, a C1 to C14 aromatic hydrocarbon moiety, and COR' where R' is a C1 to C14 aliphatic or aromatic hydrocarbon moiety; X is selected from the group consisting of Cl, Br, I and combinations thereof; a is selected from the group consisting of 0, 1 and 2; b is an integer of 1 to 4 inclusive; and a+b=3 or 4.

11. The method of claim 1, wherein the at least one titanium compound is selected from the group consisting of: $TiCl_3$, $TiCl_4$, $Ti(OCH_3)Cl_3$, $Ti(OC_6H_5)Cl_3$, $Ti(OCOCH_3)Cl_3$ and $Ti(OCOC_6H5)Cl_3$.

12. The method of claim 1, wherein the at least one magnesium compound has the formula $MgX_2$, wherein X is selected from the group consisting of Cl, Br, I and combinations thereof.

13. The method of claim 12, wherein the at least one magnesium compound is selected from the group consisting of: $MgCl_2$, $MgBr_2$ and $MgI_2$.

14. The method of claim 1, where the silica carrier material is a non-porous silica support.

15. The method of claim 1, further including removing the liquid organic solvent from the modified precursor composition of the ZN catalyst.

16. The method of claim 1, wherein removing at least a portion of the aluminum alkyl compound and reaction by-product compounds in the liquid organic solvent not consumed in converting the at least one titanium compound in the precursor composition includes neutralizing the aluminum alkyl compounds in the liquid organic solvent with hydroxyl groups.

* * * * *